Aug. 5, 1969 E. O. GILBERT 3,460,047

CASCODE AMPLIFIER OUTPUT STAGE HAVING CUTOFF PREVENTING MEANS

Filed March 21, 1967

INVENTOR.
EDWARD O GILBERT
BY Richard G. Stephens
ATTORNEY

United States Patent Office 3,460,047

Patented Aug. 5, 1969

3,460,047
CASCODE AMPLIFIER OUTPUT STAGE HAVING CUTOFF PREVENTING MEANS

Edward O. Gilbert, Ann Arbor, Mich., assignor to Applied Dynamics, Inc., Ann Arbor, Mich., a corporation of Michigan Filed Mar. 21, 1967, Ser. No. 624,797
Int. Cl. H03f 3/42
U.S. Cl. 330—18 5 Claims

ABSTRACT OF THE DISCLOSURE

A totem-pole amplifier output stage incorporating diode current routing in such a way that neither transistor becomes cutoff over wide variations in output voltage and load current, so that amplifier response is not delayed due to transistor recovery time.

This invention relates to electronic amplifiers, and more particularly, to an improved direct-coupled amplifier having improved operating speed. In the analog computer, hybrid analog-digital computer, automatic control and instrumentation arts, the quality of the operational amplifiers employed is a principal factor in determining accuracy and speed of operation. Many past operational amplifiers have employed "cascode" or "totem-pole" power output stages. The characteristics of vacuum-tube cascode power output stages are discussed in the literature, at, for example, pp. 91–94 of "Design Fundamentals of Analog Computer Components by R. M. Howe (Van Nostrand, New York, 1961). Briefly described, such stages usually include two triodes connected in series between the positive and the negative supply, with the upper triode conducting to supply the load current when the output signal is positive, and the lower triode conducting to supply the load current when the output is negative. When the upper triode is conducting heavily, it functions much like a cathode follower in which the lower triode, then near cutoff, constitutes the cathode impedance, and conversely, when the lower triode is conducting heavily, it functions much like a grounded cathode amplifier in which the upper triode, then near cutoff, functions as the plate impedance. The advantages of a cascode circuit in general are several. They provide substantial amplification but still have an output impedance almost as low as that of a cathode follower. Secondly, they require a very low zero-output "idle" current which is much less than their maximum output current capability. Thirdly, whether they draw most of their current from the B+ supply or the B− supply depends upon the sign of the output signal, and because the numbers of positive and negative amplifier output signals occurring at a given time in a large computer tend to be equal, power supply regulator requirements may be more easily met. Cascode power output stages employing transistors are also known, one type being shown, for example, in my prior copending application Ser. No. 471,790 filed July 9, 1965.

In many respects known forms of transistorized cascode amplifier stages have tended to follow design principles of their vacuum-tube predecessors, with maximum current output from one or the other of the transistors resulting in the other transistor being at or near cutoff. I have observed that driving one or the other of the transistors into and well beyond cutoff disadvantageously retards amplifier response to a later input signal which attempts to drive the circuit in the opposite direction, as appreciable time is required to restore a cutoff transistor to a conducting condition. Such delay in amplifier response is particularly a problem in the upper transistor of the totem-pole stage where static cutoff is ordinarily possible, and particularly disadvantageous in hybrid analog-digital applications where amplifier bandwidth and velocity limits should be very high. In accordance with the present invention, the prior advantages of cascode or totem-pole amplifiers are maintained, but rather than driving the upper transistor into cutoff when the other transistor is conducting, a small maintaining current is caused to continue to flow, so that response to an opposite input signal is not delayed due to the recovery time of the transistors.

Thus it is a primary object of the present invention to provide an improved transistorized (operational) amplifier having more rapid recovery response from limit output current conditions. It is a more specific object of the present invention to provide a transistorized totem-pole amplifier stage in which the upper transistor never becomes entirely cutoff. An attendant object is to provide such an amplifier stage in which the maintaining current through the transistors is very small.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figures 1, 2:
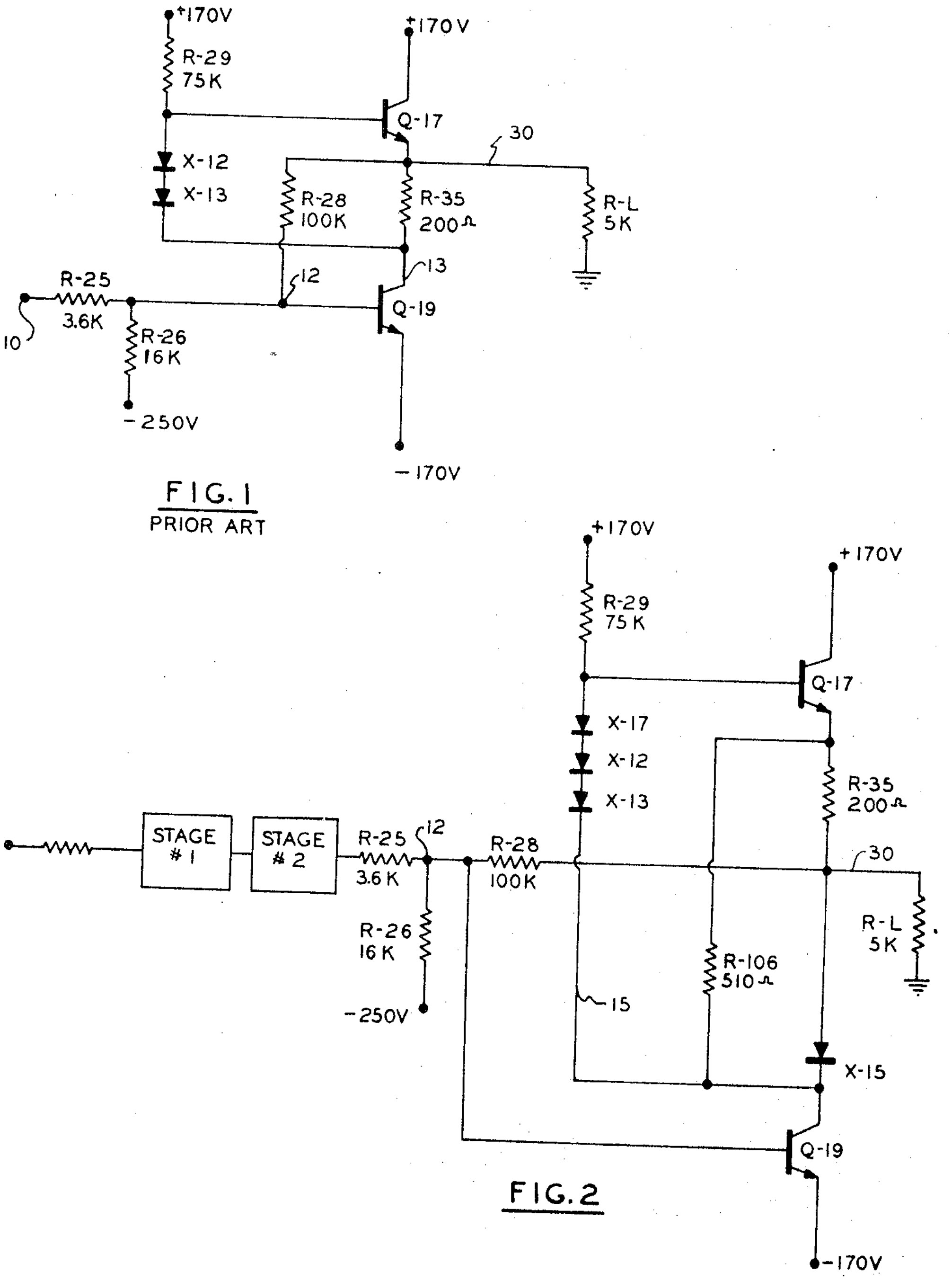
FIG. 1 is an electrical schematic of a prior form of transistorized totem-pole amplifier.
FIG. 2 is an electrical schematic of a preferred form of the invention.

In the prior art totem-pole output stage of FIG. 1, the input signal from a preceding amplifier stage is applied at terminal 10 to a voltage divider comprising resistors R–25 and R–26, the junction point 12 of which is connected to the base of lower transistor Q–19. Q–19 acts much like a conventional common-emitter amplifier with transistor Q–17 serving as its collector load resistor. The collector output of Q–19 drives the base of upper transistor Q–17, which behaves much like an emitter follower having Q–19 as its load resistance. Diodes X–12 and X–13 act as a 1.4 volt floating voltage source, which together with resistor R–35, establishes a fixed bias current for transistor Q–17.

Assume now for purposes of explanation of FIG. 1, that the transistor current gains are high enough that base currents may be neglected. At a zero volts output condition both transistors Q–17 and Q–19 are conducting lightly. Approximately 2.3 ma. current flows from the +170 volt supply through resistor R–29, through diodes X–12 and X–13 and through transistor Q–19 to the negative supply, causing about 169.3 volts drop across resistor R–29. A 5.2 ma. current flows from upper transistor Q–17 downwardly to output terminal 30, 1.7 ma. flowing through feedback resistor R–28 to input terminal 12, so that the total current through Q–19 is 5.8 ma. As previously mentioned, the low idle currents through the transistors during a zero or low output voltage condition is a known feature of totem-pole stages in general. A .7 volt drop exists across the Q–17 base-emitter junction, a .7 volt drop exists across resistor R–35, and 1.4 volts forward drop exists across diodes X–12 and X–13 in series, so that line 13 lies at −.7 volt and line 14 lies at +.7 volt, thereby causing a 3.5 ma. current through resistor R–35, with transistor Q–17 having a .7 volt base-emitter junction potential.

When the stage input terminal 10 is driven in a negative direction from the zero condition, thereby decreasing current flow in lower transistor Q–19, the current flow through resistor R–29 and diodes X–12 and X–13 is decreased, thereby decreasing the drop across resistor R–29 and raising the voltage on lines 14 and 13. When the output voltage on output terminal 30 reaches +100 volts, the voltages at the Q–19 collector (line 13) and at the Q–17 base, will have risen to +99.3 volts and +100.7 volts, respectively. Approximately 26.2 ma. will flow down from the +170 volt supply and upper transistor Q–17, with 20 ma. flowing out through the 5K load, 3.5 ma. continuing to flow through biasing resistor R–35 and approximately 2.7 ma. flowing through feedback resistor R–28. The total current flowing through lower transistor Q–19 will have decreased to 4.4 ma. It will be seen that for any value of positive output (during which none of the load current flows through 200 ohm resistor R–35), that diodes X–12 and X–13 keep the Q–17 base .7 volt positive with respect to the Q–17 emitter, so that 3.5 ma. flows through resistor R–35 and Q–17 is conducting with a .7 volt drop across its base-emitter junction.

When, on the other hand, the stage input terminal 10 is driven in a positive direction, increasing the current flow in lower transistor Q–19, increased current flows through resistor R–29, thereby increasing the drop across resistor R–29, thereby dropping the voltage on the Q–19 collector and on the Q–17 base. Now, however, it will be seen that the load current flows through resistor R–35 (and down through lower transistor Q–19), considerably increasing the voltage drop across resistor R–35. When the output voltage reaches −25 volts and the load current reaches approximately 5 ma., with 3.5 ma. flowing through R–35 and 1.45 ma. through R–28, it will be seen that Q–17 emitter current will be only .05 ma., and that any further increase in the load current will result in Q–17 being cutoff. When the output voltage reaches −100 volts, voltages at the Q–19 collector and the Q–17 base reach −103.9 volts and −102.5 volts, respectively. It should be noted that the −102.5 volt potential on the Q–17 base, with −100 volts on the Q–17 emitter means that Q–17 will be well beyond cutoff. A 19.3 ma. portion of the 20 ma. load current flowing through the 5K load flows through resistor R–35 and a .7 ma. portion through feedback resistor R–28. It will be seen that an increased current of 3.9 ma. will flow through resistor R–29 and diodes X–12 and X–13 and down through lower transistor Q–19, so that the total current through lower transistor Q–19 equals 23.2 ma.

The problem with the prior art circuit of FIG. 1 under the last-recited conditions is that the combination of a heavy load (such as 20 ma.) and a maximum negative output excursion (such as to −100 volts) causes upper transistor Q–17 to become completely cutoff. If the input signal at terminal 10 then suddenly goes negative, a time delay ensues before transistor Q–17 can be turned on again, so that the overall amplifier response is delayed, due to the recovery time of transistor Q–17. It also can be shown that cutoff of upper transistor Q–17 frequency may cause lower transistor Q–19 to cutoff for a transient interval as Q–19 attempts to turn Q–17 back on, and the transient delay in Q–19 response further limits amplifier performance.

Initially it might appear that Q–17 cutoff could be delayed or avoided merely by insertion of further diodes in series with X–12 and X–13. A total of six diodes in series would allow Q–17 to be forward biased until the drop across R–35 reaches 4.2 volts, which would occur at an ample output load current of 21.6 ma. However, with such an arrangement, it may be calculated that the rather large current of 21 ma. then would have to circulate in R–35 even in the absence of an output signal, thereby losing entirely the main advantage of the totem-pole configuration, its low idle current capability, and Q–17 would have to carry approximately 44 ma. to provide a +100 volt 20 ma. output to the 5K load, so that an extremely expensive transistor would be required at Q–17. It also might appear from cursory examination that cutoff of Q–17 during high negative output-high load conditions could be avoided by decreasing the size of R–35. Reduction in the size of R–35, however, would similarly result in a drastic increase in idle current.

In the illustrative embodiment of the invention shown in FIG. 2, parts corresponding to those of FIG. 1 have been given corresponding designations. It may be noted in FIG. 2 that the output terminal 30 is situated at the lower end of resistor R–35, rather than at the upper end as in FIG. 1. Diodes X–12, X–13 and X–17, each having a contact potential of .7 volt, act together as a floating voltage source of 2.1 volts. Diode X–15 acts as a routing diode, and resistor R–106 aids in proper biasing of lower transistor Q–19, as will be seen as the description proceeds. The assumption that base currents are small enough to be neglected is made again in the following description.

When the output voltage at terminal 30 is zero volts, both upper transistor Q–17 and lower transistor Q–19 are conducting, as are diodes X–12, X–13, X–15 and X–17. With output terminal 30 at zero volts and input terminal 12 at −169.3 volts, approximately 1.7 ma. flows leftwardly through feedback resistor R–28. Diode X–15 will be seen to establish line 15 at −.7 volt, so that 2.3 ma. flows through resistor R–29 and diodes X–17, X–12 and X–13, and the voltage across the diodes establishes the Q–17 base potential at +1.4 volts, so that the Q–17 emitter lies at +.7 volt and 3.5 ma. flows through biasing resistor R–35 and approximately 2.8 ma. flows through R–106. A 1.7 ma. portion of the R–35 current flows through feedback resistor R–28 and the remaining 1.8 ma. flows through diode X–15. Thus the total idle current through the lower transistor Q–19 collector is the sum of the X–13, X–15 and R–106 currents, or a total of 6.9 ma. Diodes X–12, X–13 and X–17 in series will be seen to perform the function of a floating constant voltage source, contributing a +2.1 volts potential having a polarity tending to forward-bias the Q–17 base-emitter junction, while the voltage drop across resistor R–106 acts in opposition. As will become clear as the description proceeds, a 1.4 volts drop always is maintained across resistor R–106, so that the net Q–17 base-emitter biasing potential is maintaained at a forward .7 volt.

As amplifier stage #2 drives terminal 12 in a negative direction, decreasing the collector current of lower transistor Q–19, the Q–19 collector voltage (and hence the Q–17 base voltage) rise in a positive direction due to the decreased drop in resistor R–29, and upper transistor Q–17 is caused to conduct increasing current. When the output voltage at terminal 30 has reached +100 volts, so that 20 ma. flows through load resistor R–L, 2.7 ma. will be seen to flow through feedback resistor R–28, so that the current through biasing resistor R–35 equals 22.7 ma., providing a 4.5 volts drop across R–35, so that the Q–17 emitter lies at +104.5 volts, and hence the Q–17 base will be at +105.2 volts. With the Q–17 base at 105.2 volts, .9 ma. will be seen to flow through resistor R–29 and diodes X–17, X–12 and X–13 and the potential at line 15 will be seen to be 2.1 volts lower, or at a +103.1 volts level. With line 15 at +103.1 volts, it is important to note that diode X–15 will be reverse-biased, and the same 2.8 ma. current as before will be seen in flow through R–106. The total current through lower transistor Q–19 will be seen to have decreased to 3.7 ma. due to the decrease in current through R–29 and the cutoff of the current previously flowing through diode X–15.

When, conversely, amplifier stage #2 drives terminal 12 in a positive direction, increasing the current through lower transistor Q–19, the Q–19 collector potential on line 15 (and hence the Q–17 base potential will be seen to fall, which ordinarily would tend to decrease the current through upper transistor Q–17, and in prior art totem-pole circuits drive Q–17 as far as cutoff. When the output voltage on terminal 30 reaches −100 volts, the feedback current through resistor R–28 will be seen to have decreased to .7 ma. Line 15 will lie at −100.7 volts due to the forward potential of diode X–15, the Q–17 base will lie 2.1 volts higher, or at —98.6 volts, due to the voltage across diodes X–12, X–13 and X–17 and the Q–17 emitter will lie at —99.3 volts due to the .7 volt base-emitter junction voltage of transistor Q–17. The current through resistor R–29 then will have increased to 3.6 ma., the current through R–35 will be 3.5 ma., and the current through R–106 will remain as before, at 2.8 ma. The 20 ma. load current and the 3.5 ma. current will flow through X–15, and hence the total current through lower transistor Q–19 will be seen to be 29.2 ma.

It will be seen from the above numerical treatment that both upper and lower transistors Q–17 and Q–19 remain conducting at all times during heavy load current excursions in either direction, so that no delay is required in order to turn on a cutoff transistor, as was the case with the prior art circuit of FIG. 1. Furthermore, it will be seen that the improved circuit of FIG. 2 still draws a modest idle current which is only a small fraction of the stage maximum output current capability, so that the main advantages of totem-pole operation have been preserved.

In either FIG. 1 or FIG. 2 it will be clear that Q–17 conducts the major portion of the load current for positive outputs and the Q–19 conducts the major portion for negative outputs. In FIG. 1 it will be seen that the flow of heavy load current through biasing resistor R–35 during negative output conditions is the cause of the undesired cutoff of Q–17. At first glance, one would assume that connection of the load to the bottom of biasing resistor R–35, so that the heavy load current would flow through R–35 during positive output conditions would merely shift the problem, so that the undesired cutoff might occur during positive output conditions. The insertion of diode X–15, as shown, however, so that diode X–15 becomes back-biased during heavy loads with a positive output, prevents the large drop across R–35 from causing undesired cutoff. With diode X–15 back-biased, the large voltage drop across R–35 has no effect upon the Q–17 bias. With the voltage across resistor R–106 always constant at 1.4 volt and with diodes X–12, X–13 and X–17 providing a constant drop of 2.1 volts, the base-emitter bias of transistor Q–17 will be seen always to be fixed at an established .7 volt.

The purpose of resistor R–106 is to increase the idle current through Q–19 during positive output current conditions. With the values shown, it will be recalled that the current through resistor R–29 decreased to only .9 ma. during +100 volt output conditions. If the amplifier is driven so far as to provide a +150 volt output signal, the current through R–29 would decrease even further, to merely .27 ma., which may be regarded as too small to guarantee quick response. Connection of resistor R–106 provides a steady maintaining current of 2.8 ma., so that Q–19 current cannot drop below that level under any conditions. It will be appreciated that the size of R–106 may be varied to provide greater or lesser minimum currents to suit the special characteristics of particular transistors. A 2.1 volt Zener diode may be substituted for the series string (X–12, X–13, X–17) of diodes. All of the diodes shown are preferably silicon junction diodes. It also will be apparent that the size of resistor R–35 may be adjusted to adjust the stage idle current to a desired level. Amplifier stages constructed in accordance with the present invention may advantageously incorporate the current-limiting protective circuitry shown in my prior copending application Serial No. 471,790 filed July 9, 1965.

It will be apparent that PNP transistors may be substituted for the NPN types shown with appropriate polarity inversions which will be obvious to those skilled in the art. Furthermore, the voltage range of the amplifier and its output current capabilities may be scaled upwardly or downwardly without departing from the invention.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. An electronic amplifier output stage, comprising, in combination: first and second transistors each having emitter and collector electrodes and a base terminal, said first transistor having a predetermined base-emitter junction forward potential; a first resistance and a unidirectionally-conducting device connected in series, said unidirectionally-conducting device having a predetermined forward contact potential; circuit means connecting the collector-emitter circuit of said first transistor, said first resistance and said unidirectionally-conducting device, and the collector-emitter circuit of said second transistor in series between first and second terminals of a power supply; means for providing a constant voltage greater than the sum of said forward contact potential and said base-emitter junction forward potential and a second resistance connected between the collector electrode of said second transistor and said power supply, the junction point between said means for providing a constant voltage and said second resistance being connected to said base terminal of said first transistor to continually bias said first transistor to a conducting condition; means for applying an input signal to the base terminal of said second transistor; and an output terminal adapted to connect a load to the junction point between said unidirectionally-conducting device and said first resistance.

2. An amplifier stage according to claim 1 in which said unidirectionally-conducting device comprises a diode.

3. An amplifier stage according to claim 1 having a third resistance connected in parallel with the series connection of said first resistance and said unidirectionally-conducting device.

4. An amplifier stage according to claim 1 having a feedback resistance connected between said base terminal of said second transistor and the junction point between said unidirectionally-conducting device and said first resistance.

5. An amplifier stage according to claim 1 in which said means for providing a constant voltage comprises a plurality of diodes connected in series with each other.

References Cited

UNITED STATES PATENTS

| | | | |
|---|---|---|---|
| 3,237,117 | 2/1966 | Collings et al. | 330—18 X |
| 3,271,590 | 9/1966 | Sturman | 330—18 X |
| 3,358,241 | 12/1967 | Hull | 330—15 |

ROY LAKE, Primary Examiner

S. H. GRIMM, Assistant Examiner

U.S. Cl. X.R.

330—22, 24, 40